(12) United States Patent
Austin et al.

(10) Patent No.: US 8,321,957 B2
(45) Date of Patent: Nov. 27, 2012

(54) CONTROLLING ACCESS TO CONTENT AND/OR SERVICES

(75) Inventors: Jarrod Austin, Englewood, CO (US); Seth Byerley, Parker, CO (US); John T. Kennedy, Denver, CO (US); Sathyan Krishna, Denver, CO (US); Daniel L. Rudolph, Castle Rock, CO (US); Mark Templeman, Parker, CO (US); James Matthew White, Denver, CO (US); Matthew J. Coburn, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 12/946,676

(22) Filed: Nov. 15, 2010

(65) Prior Publication Data

US 2011/0061109 A1    Mar. 10, 2011

Related U.S. Application Data

(62) Division of application No. 11/618,462, filed on Dec. 29, 2006, now abandoned.

(51) Int. Cl.
  G06F 7/04 (2006.01)
  G06F 17/30 (2006.01)
  H04N 7/16 (2011.01)
(52) U.S. Cl. .......................... 726/27; 725/28
(58) Field of Classification Search ............ 726/27
  See application file for complete search history.

(56) References Cited

U.S. PATENT DOCUMENTS

| 6,701,523 | B1 | 3/2004 | Hancock et al. |
| 6,774,926 | B1 | 8/2004 | Ellis et al. |
| 6,922,843 | B1 | 7/2005 | Herrington et al. |
| 7,209,957 | B2 * | 4/2007 | Patron et al. .......... 709/208 |
| 7,448,058 | B2 | 11/2008 | Heyner et al. |
| 7,540,014 | B2 * | 5/2009 | Vasishth et al. .......... 726/1 |
| 2003/0061606 | A1 | 3/2003 | Hartwig et al. |
| 2004/0210928 | A1 * | 10/2004 | Hamzy et al. .......... 725/31 |

(Continued)

FOREIGN PATENT DOCUMENTS

WO    WO 2004/046377    7/2004

OTHER PUBLICATIONS

U.S. Appl. No. 11/618,462.

(Continued)

*Primary Examiner* — Kambiz Zand
*Assistant Examiner* — Dant Shaifer Harriman
(74) *Attorney, Agent, or Firm* — Ingrassia Fisher & Lorenz, P.C.

(57) ABSTRACT

The exemplary embodiments of the method and system according to the present invention provide a system and method for controlling access to audiovisual content such as television shows, video-on-demand services or streaming video which can be delivered by cable, satellite, wired or wireless networks, cell phones, the Internet, etc. More particularly, the present invention provides a capability to define certain criteria which can be used to restrict access to content based on combinations of various parameters including, but not limited to, time of day, day of the week, type of content, source of content, content display device, etc. These criteria may also be provided by data storage arrangements or a network, and access restrictions specified by such criteria can be associated with a plurality of display devices.

20 Claims, 6 Drawing Sheets

U.S. PATENT DOCUMENTS

| | | | |
|---|---|---|---|
| 2005/0028191 A1* | 2/2005 | Sullivan et al. | 725/28 |
| 2005/0155052 A1 | 7/2005 | Ostrowska et al. | |
| 2005/0177640 A1 | 8/2005 | Rubinstein et al. | |
| 2005/0251827 A1 | 11/2005 | Ellis et al. | |
| 2006/0037083 A1 | 2/2006 | Kortum et al. | |
| 2006/0179056 A1 | 8/2006 | Rosenberg | |
| 2007/0101393 A1* | 5/2007 | Ito | 725/132 |
| 2007/0192823 A1* | 8/2007 | Andersen et al. | 726/1 |
| 2008/0019516 A1* | 1/2008 | Fransdonk | 380/201 |
| 2008/0163286 A1 | 7/2008 | Rudolph et al. | |
| 2008/0163365 A1 | 7/2008 | Austin et al. | |
| 2010/0245883 A1* | 9/2010 | Matsushita | 358/1.14 |

OTHER PUBLICATIONS

Office Action dated Feb. 25, 2010, U.S. Appl. No. 11/618,462, 10 pages.

Amendment and Response to Office Action dated May 25, 2010, U.S. Appl. No. 11/618,462, 13 pages.

Final Office Action dated Aug. 4, 2010, U.S. Appl. No. 11/618,462, 9 pages.

Request for Continued Examination and Amendment and Response to Final Office Action, dated Nov. 4, 2010, U.S. Appl. No. 11/618,462, 13 pages.

Office Action dated Dec. 14, 2010, U.S. Appl. No. 11/618,462, 10 pages.

Office Action dated Sep. 3, 2010, U.S. Appl. No. 11/966,600, 12 pages.

Amendment and Response to Office Action dated Dec. 3, 2010, U.S. Appl. No. 11/966,600, 12 pages.

Final Office Action dated Feb. 3, 2011, U.S. Appl. No. 11/966,600, 23 pages.

Amendment and Response to Final Office Action dated May 3, 2011, U.S. Appl. No. 11/966,600, 13 pages.

Request for Continued Examination dated Jun. 3, 2011, U.S. Appl. No. 11/966,600, 1 page.

U.S. Appl. No. 11/966,600.

Office Action dated Jul. 20, 2011, U.S. Appl. No. 11/966,600, 22 pages.

Amendment and Response to Office Action dated Oct. 19, 2011, U.S. Appl. No. 11/966,600, 12 pages.

Final Office Action dated Oct. 28, 2011, U.S. Appl. No. 11/966,600, 25 pages.

Request for Continued Examination and Amendment and Response to Final Office Action dated Jan. 30, 2012, 14 pages.

USPTO "Non-Final Office Action" mailed Jun. 28, 2012 for U.S. Appl. No. 11/966,600, filed Dec. 28, 2007.

* cited by examiner

CONTROLLING ACCESS TO CONTENT AND/OR SERVICES

CROSS-REFERENCE TO RELATED APPLICATION

This application is a divisional of U.S. patent application Ser. No. 11/618,462, entitled "Controlling Access to Content and/or Services", filed on Dec. 29, 2006, which is hereby incorporated by reference herein in its entirety.

FIELD OF THE INVENTION

The present invention generally relates to a system and method for controlling access to content and more particularly to defining one or more "locks" which can restrict access to content based on combinations of various parameters including, but not limited to, time of day, day of the week, type of content, source of content, content display device, etc.

BACKGROUND INFORMATION

The availability of content, including audiovisual content, from a variety of sources is increasing significantly. Such content can include, for example, cable or satellite television shows, video-on-demand or pay-per view television programming services, digitally recorded movies or shows, streaming video and/or audio, downloadable video games or other applications, etc. Audiovisual content can be accessed using many types of devices and systems including, but not limited to, on-air broadcasts, cable systems, satellite systems, the Internet, wireless networks, cell phones, wired or wireless networks, digital video recorders (DVRs), personal computers (PCs), mobile or handheld computing devices, cell phones or personal digital assistants (PDAs).

Certain sources of content can provide "lockout" options that may limit access to content. For example, cable and satellite television services are often accessed through a set-top box (STB) that provides channel selections, video-on-demand options, recording capabilities, recorded programs, etc. STBs may also provide certain "lockout" options. These options can block the display of all content on certain channels or content having a particular rating (PG, R, MA, etc.) unless a password is entered. Passwords can be set by a user to prevent access to the specified channels by others unless they know the password. Entry of the password in such lockout systems can be performed, for example, by using a remote control or by pressing buttons on the STB itself. Such conventional lockout systems may only limit or prevent access to certain selected content associated with a particular STB, television set or monitor.

It may be desirable to limit access to various types of content based on different criteria or combinations thereof. For example, parents may not want their children to watch programming containing mature themes and/or they may wish to prevent access to all programs after a certain hour at night. Subscribers to pay-per-view services may wish, for example, to prevent users from ordering programming on specific days and incurring additional charges, and/or to prevent such ordering only by certain individuals. It may also be desirable to limit access to certain content which may be viewed or otherwise obtained from several sources such as various televisions/STBs, websites on the Internet, or DVRs.

Therefore, there may be a need to provide a more robust system and method for controlling access to content obtainable from a variety of sources based on different combinations of criteria.

SUMMARY OF THE INVENTION

Exemplary embodiments of the present invention can provide a system and method for limiting access to various types of content based on certain selected criteria. Content can include, for example, broadcast, cable or satellite television programs, pay-per-view or on-demand shows, music, video, games or other programs or data obtained via wired or wireless networks, including via the Internet, digitally-recorded video, etc.

Access to content can be restricted by defining "locks" that contain information which may be used to determine whether access to particular content is allowed. Locks can be associated with various devices that may be used to obtain and/or view content. Devices can include, e.g., STBs, television monitors, DVRs, cell phones, PDAs, personal computers and the like. Locks can be implemented at any location capable of blocking the delivery of content. The location may be selected based on the type of content and/or the device used to access or view the content. A plurality of locks can be associated with a device, and one or more locks can be selected based on user preferences. More than one lock may also be activated on a device simultaneously.

Locks can be used to restrict or prevent access to content based on various criteria or combinations thereof. Locks may also allow access to certain content if an appropriate password or code is provided to a device which implements the lock. Certain criteria may be based on time, such as certain times of day or days of the week, or total access time within a specified period such as a day or a week. Locks may also be associated with certain content sources, such as particular television channels or websites. They can also be defined based on certain types of programming, such as programs having a certain rating or those incurring specific fees to access.

Locks can be configured to restrict access to particular content for specific individuals. Various locks can be defined for a single content source, and different users can be provided with unique passwords and, optionally, identification numbers or codes (IDs). Each password and/or ID provided to a content source can activate a particular lock which can permit access to certain content while preventing access to other content.

Exemplary embodiments of the present invention can further provide an ability to remotely limit access to content on various devices. For example, locks may be generated using an STB, personal computer, cell phone, etc. A lock thus created can then be provided to any device capable of receiving the information provided in the lock. Locks created on a STB or personal computer, e.g., can be applied to all other STBs within a household via a network or an alternative mechanism capable of transferring lock information between STBs or other devices. For example, lock information/settings may be transmitted to a portable device from a first STB and then from the portable device to a second STB. Exemplary portable devices for use in such lock transferral include, but are not limited to, a remote control, a mobile telephone, a USB flash memory device, and so forth. A lock associated with a device can also be activated or deactivated remotely. Locks may also be stored in the form of a data file on a portable memory storage medium such as, e.g., a flash drive, a memory card, or a digital audio player. Locks may be applied to any device capable of accessing the storage medium and configured to restrict access to content based on the information provided by the data file.

Locks may also be used to restrict access to specified content that can be recorded using, e.g., a DVR. For example, a television program having a rating that is restricted by a lock may be recorded and encrypted. The password associated with the lock may then be required to unencrypt the recorded content for viewing.

These and other objects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION

Figure 1:
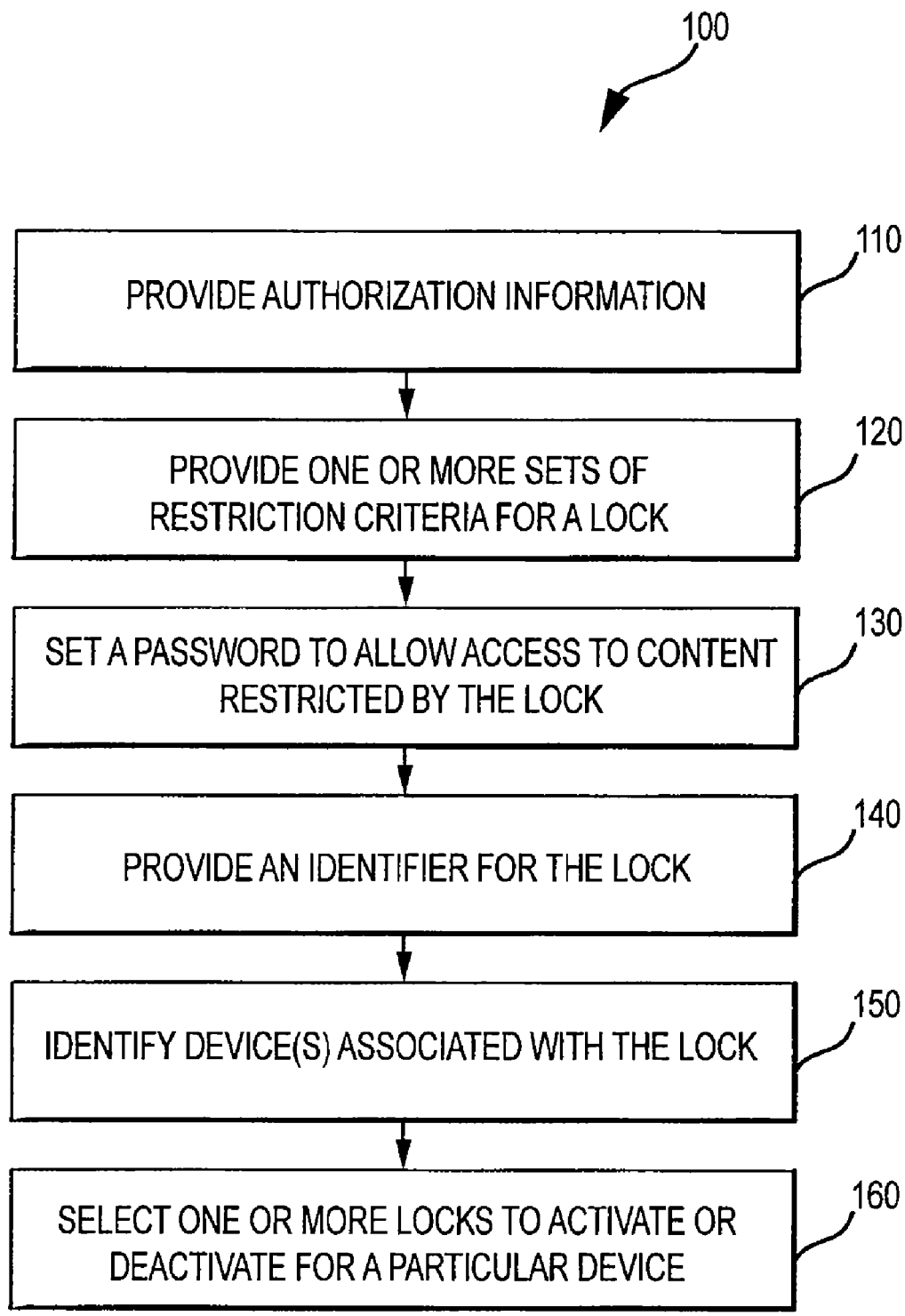
FIG. 1 is an exemplary flowchart of a procedure for restricting access to content in accordance with exemplary embodiments of the present invention.

Exemplary embodiments of the present invention provide a method and system for limiting access to content including, but not limited to, audiovisual content, through various devices. Access to content can be prevented based on a wide range of criteria associated with particular times, devices, users and/or characteristics of the content. Information which may be used to specify criteria for allowing or preventing access to certain content can be referred to as a "lock." A device may have more than one lock associated with it or available for activation.

A lock may be provided in the form of hardware, firmware or software. For example, an STB or a DVR may contain programmed routines to generate, receive and/or implement locks. In certain exemplary embodiments of the present invention, locks may be stored in a memory arrangement, e.g., as a set of parameters or instructions. The stored lock may then be transferred to any device capable of receiving the lock. Locks may also be communicated to various devices using, e.g., a wired or wireless network.

Access to content restricted by a lock can be provided, e.g., by providing a password or other information associated with the lock. The lock can be configured to allow access to some or all of the restricted content upon receipt or detection of a password. Certain locks may be provided with no password capability, and may simply prohibit access to certain content. The restriction criteria can be based on, e.g., time, characteristics of the content, or any combination thereof. For example, a lock may be configured to prevent an STB from displaying any programming between the hours of 11 p.m. and 6 a.m., or it can block all access to any programming rated R or AO at all times. Authorization information may be associated with such locks or with any device implementing a lock, where providing this information can allow activation, modification and/or deactivation of the lock.

Content can include audio and/or video information, as well as any other form of digital data. Content can include, but is not limited to, television programs and movies which may be broadcast or provided by cable or satellite services; video-on-demand and pay-per-view programming; video and/or audio (streaming or downloadable) provided from a network or the Internet via a wired or wireless connection; content recorded by a DVR or provided on a DVD or other memory storage medium, etc.

Access to audiovisual content can be through a variety of devices, including but not limited to televisions or video monitors (which may be connected to a particular STB and/or DVR), personal computers, "media servers" which can include computers or certain video game consoles, cell phones, etc. An STB may incorporate a DVR in the same housing, or they may be provided as separate pieces of equipment. A television or video monitor may also incorporate the functionality of an STB or DVR within a single housing. Locks can be used with any such device that is capable of receiving and implementing the information contained in a lock. Locks can also be applied to any apparatus or source that can provide content to a device, such as a network server or cell phone service provider.

In accordance with exemplary embodiments of the present invention, two or more locks can be associated with a device. The locks can be made available using, e.g., an on-screen menu. A user can select one or more locks to activate or deactivate on a particular device. This selection can be made using the device itself or remotely. For example, locks may be selected and applied using a control panel on a device, a remote control, a remote apparatus communicating via a wired or wireless network, etc. An option may also be provided for a user to activate or deactivate one or more locks for several devices at the same time. An authorization code may be required for access to a menu displaying locks and/or for activating and deactivating locks. Different authorization codes can be provided which correspond to particular locks and/or particular devices. For example, a first user may be provided with a first authorization code which allows the user to only activate locks on one particular device, whereas a second user may have a second authorization code which allows activation or deactivation of locks on several devices.

An exemplary procedure 100 for generating and using a lock is shown in FIG. 1. The lock can be generated using a computer, a control panel or remote control associated with a television, STB, or other device. In step 110, authorization information can be provided to initiate creation of a lock. The authorization can be required to allow only certain "administrators" of a device, e.g., a parent or an owner of the device, to create, activate and/or deactivate a lock. The authorization information can be in a form of an alphanumeric code, a combination or sequence of button or key presses, a physical key, etc. Authorization information may have any form that can be used for a password, as described herein.

Criteria for restricting access may then be provided in step 120. Such criteria can be based on, for example, time or various characteristics or features associated with the content. Various combinations of criteria can be used to generate a single lock. Examples of time-based restrictions include a lock for young children that prevents all access to television programs between the hours of 8 a.m. and 7 p.m., or a lock for older children that prevents access to all programs between 7 p.m. and 7 a.m. Time-based restrictions may also be implemented as multiple locks serving the same purpose. For example, in the above scenario, a first lock may be active from 8 a.m. to 7 p.m. and a second lock from 7 p.m. to 7 a.m. Alternatively, a single lock may be configured to extend from 8 a.m. to 7 a.m. the next day and change access properties at 7 p.m. Access to content may also be based on days of the week, such as preventing access to television programs after 10 p.m. on weeknights and after midnight on weekends. Restrictions may also be based on days of the week. Restriction criteria can also be based on cumulative time, such as limiting access to all television channels to a total of 5 hours per day.

Other locking criteria which may be provided in step 120 can be associated with characteristics of the content. For example, programming provided by satellite or cable television services can be associated with ratings such as G, PG, PG-13, R, NC-17, etc. Such ratings can be provided in the form of "metadata" which may be accessed and/or viewed using various display devices. Metadata can also include certain keywords such as, e.g., "violence," "nudity," "language," a person's name (such as an actor or director), category denominator (e.g., "comedy," "drama," "cartoon"), and so on. Metadata may be attached to, or embedded in, content by the content provider. As an example, program information for a television show broadcast by a satellite content provider is typically included with the television show as metadata. A lock can be configured to restrict access, e.g., to a particular television show, including daily or weekly episodes of such shows. A lock may also be configured to restrict access to content based on any combination of the above exemplary criteria. It should be understood that the examples of metadata provided herein, along with the examples of how it is provided, are illustrative only.

A lock can restrict access to content associated with certain metadata, either alone or in combination with time restrictions such as those described herein. Access to content on web pages, e.g., using a personal computer which may be connected to a network or the Internet, may also be restricted based on metadata or other information associated with the web pages. For example, a lock may prevent viewing of web pages located on a certain domain, or web pages containing certain words or types of images. A lock may also be configured to restrict access to certain types of network-based content, such as streaming media, instant messaging, chatrooms, checkout web pages for online stores, and so on. Any type of metadata associated with content which can be identified by a device can also be used as a basis for restricting access to the content such as, e.g., keywords.

Locks may also be used, for example, to restrict access to content that requires a fee to be paid, such as pay-per-view movies or events provided by a satellite provider, or files that can be downloaded to a cell phone such as wallpapers or ringtones. Such restrictions can be combined with any of the other exemplary criteria for limiting access to content described herein.

Access to content restricted by a lock can be configured in step 130 for particular users by providing a password. A password can refer to any type of information that can be provided or communicated to a device associated with the lock. A password can be, for example, an alphanumeric code that may be entered using a keyboard, remote control, control panel on a device, and so on. A password may also be in a form of any sequence of input signals, such as a series of key presses on a keypad or control panel. A password may also be provided, e.g., as a memory device or other information storage medium which can be connected to the device implementing the lock or in communication with the locking device. For example, a password can be provided on a USB drive, a flash memory card, a magnetic stripe on a plastic card, etc., or as data on a computer or cell phone which can communicate with any device implementing the lock.

Passwords can also have the form of biometric data such as, e.g., information associated with a fingerprint, an iris of an eye, and so on. For example, an STB or computer may be equipped with a fingerprint scanner which can permit access to content restricted by a lock. Passwords can also be associated with a code provided by a device such as a key fob, where the code can be configured to change with time. Passwords may also include any combination of the types of information listed herein.

Passwords may be used to access content restricted by a lock in various ways. For example, access to content on a device may be prevented at certain times, e.g., after 9 p.m., as described above. Passwords may be provided to certain users or groups of users. Each password or code can be associated with a specific lock which allows access to a certain subset of restricted content. Several locks may be defined and applied to a single device, with a distinct password corresponding to each lock. Alternatively, a single lock can include several sets of criteria for allowing access to content. Access to content corresponding to a particular set of criteria can be granted by supplying a corresponding password or code. A password may also be configured to bypass only certain restriction criteria associated with a lock, while continuing to block access to content based on other criteria.

For example, a lock may be configured to prevent access to all programming provided by a cable television system after 9 p.m. A first password may allow access to programs rated G or PG until 11 p.m. A second password may allow access to shows rated G, PG, PG-13 or R until midnight. A third password may allow unlimited access to all regular channels at any time but may prevent access to all pay-per-view services. In this manner, an administrator can allow different users to access various subsets of content based on assigned passwords. Alternatively, four separate locks (or three, or two) may be used to implement this locking scheme.

Restricted content may optionally be hidden from users unless and until a password is entered which allows access to additional content. For example, a lock for children that restricts access to G-rated programs may prevent all recordings, downloads, listings and descriptions of programs having a higher rating from being displayed on a channel menu or guide. Specific channels, recorded or downloaded content, or services that are restricted may also be prevented from being displayed.

An identifiers or label can be provided for a lock in step 140. An identifier can help to identify, e.g., which users are to be affected by a lock or which restriction criteria are associated with the lock. Identifiers may be displayed, for example, on a list or menu of active and/or available locks associated with a device. They can also help to ensure that a password associated with each lock or set of restrictions is provided to the correct person.

A lock may be associated with one or more devices in step 150. A device may have two or more locks associated with it, whereby one or more of these locks may be activated or deactivated by an authorized user (e.g., a user who has an authorization code associated with a lock). A plurality of locks can be generated or configured on a certain device, such as a particular STB associated with a television monitor. One or more of these locks may then be associated with other specified devices which can communicate with the STB. For example, a lock restricting access to adult content provided by a DVR or satellite service may be applied to or activated on all televisions in a home except for a television located in the master bedroom. Adults can be provided with a password associated with the lock to enable viewing of adult content on any television in the home.

Information describing lock criteria can be configured to be accessible by any device which can communicate with any other device implementing the lock. For example, a single STB can be configured to display all locks associated with other STBs, televisions and/or DVRs within a household.

A lock may also be applied to several devices capable of implementing the lock. For example, a time-based lock or one that restricts access to adult content can be applied, e.g., to a television, a DVR, an STB, a computer, a cell phone, and so on. The lock can be distributed to such devices using any available communication pathways such as a wired or wireless network.

As another example, restrictions based on time and/or content can be applied to certain computers which access the Internet through a local network, while allowing unrestricted access to any web page by other computers. This type of lock can be used, e.g., to prevent children from accessing inappropriate content on the Internet or from spending too much time on their computer.

A lock can be activated or deactivated in step 160 of FIG. 1. A plurality of locks can be made available, and one or more locks may be activated or deactivated for a particular device by a user. Activation of a lock can refer to restricting access to content matching criteria associated with a lock. Activation can be performed at the device itself using a control panel or, alternatively, it may be performed remotely. Remote activation can be performed using any equipment which can communicate with the device associated with the lock, such as a remote control. Examples of remote activation include activating a lock for an STB by sending a command from a networked computer or from a cell phone which can communicate with the STB via a wireless network. Activation of a lock can require a user to enter the proper password to access some or all of the restricted content, according to the configuration of the lock. Deactivation of a lock can be performed in a similar manner, and it can allow access to some or all restricted content without requiring entry of a password.

A device that is capable of implementing a lock can be configured to compare criteria associated with any active lock before providing requested content. For example, an STB or DVR may compare current time to any time-based criteria configured in a lock, and if the current time corresponds to a restricted time, access to the content may be blocked. Similar comparisons may also be made with any other lock criteria used to restrict access to content, such as certain characteristics of the content as described herein. Lock criteria may also be stored remotely from a device implementing a lock. When content is requested from the device, it may communicate with another device or memory storage arrangement which contains the lock criteria for comparison. If a password is provided when requesting content, the device can also compare the provided password with any passwords associated with the lock. Access to some or all of the requested content may then be provided if the password corresponds to one associated with the lock configuration.

In certain exemplary embodiments of the present invention, a lock may be generated without first providing authorization information. Authorization may only be required when the lock is provided to a device or activated on the device. A lock can also be stored as a data file or other information structure on a portable memory storage medium such as, e.g., a universal serial bus (USB) drive, a memory card, volatile memory, portable magnetic storage, portable optical storage, or a digital audio player (DAP). The lock can be applied to a device by transferring data from the storage medium using any appropriate data transfer procedure.

This portability aspect of locks can simplify control of content to various users. For example, televisions or STBs may be provided with a USB slot that is capable of reading a data file associated with a lock and restricting access to content based on that data. A set of restriction criteria appropriate for children can be stored on a USB drive. This USB drive can be connected to the television or STB, and an authorization code may be provided to activate the lock. In this manner, a particular lock can be applied directly to several devices using portable memory media or a network connection to share the lock between devices and thus restrict access to content accordingly. This procedure can be much simpler, faster and more consistent than configuring lock criteria and options on each individual device.

Figure 2A:
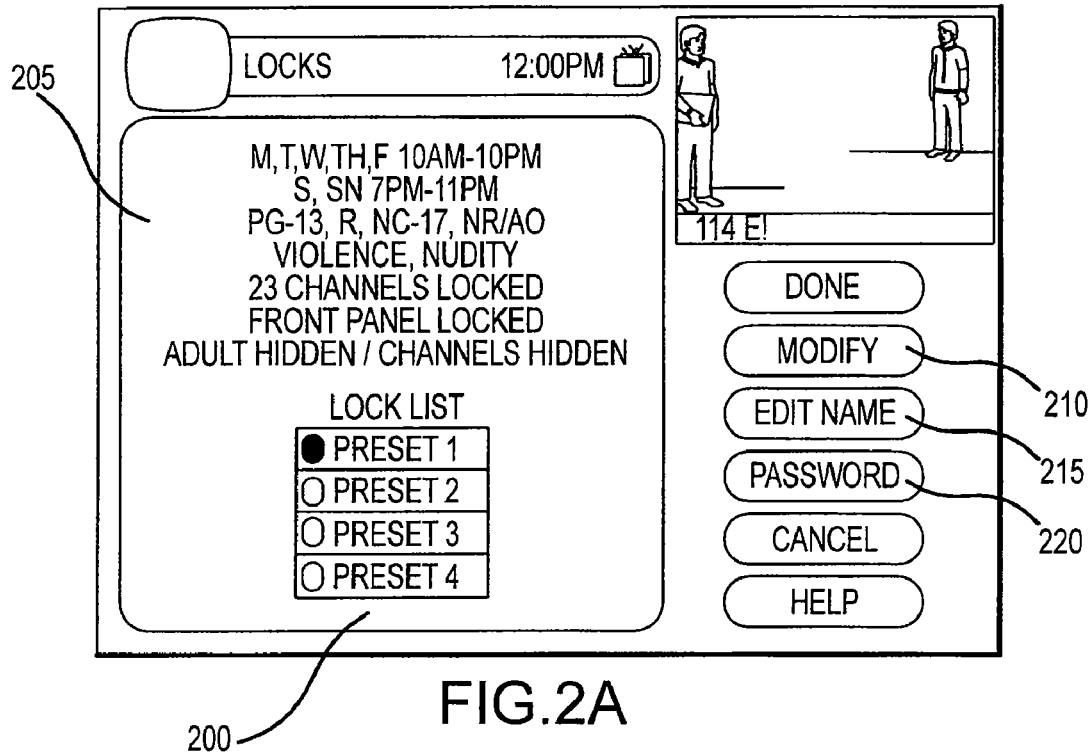
FIG. 2A is an exemplary configuration screen in accordance with embodiments which can display and provide access to configuration settings for four sets of content restriction criteria.
Figure 2B:
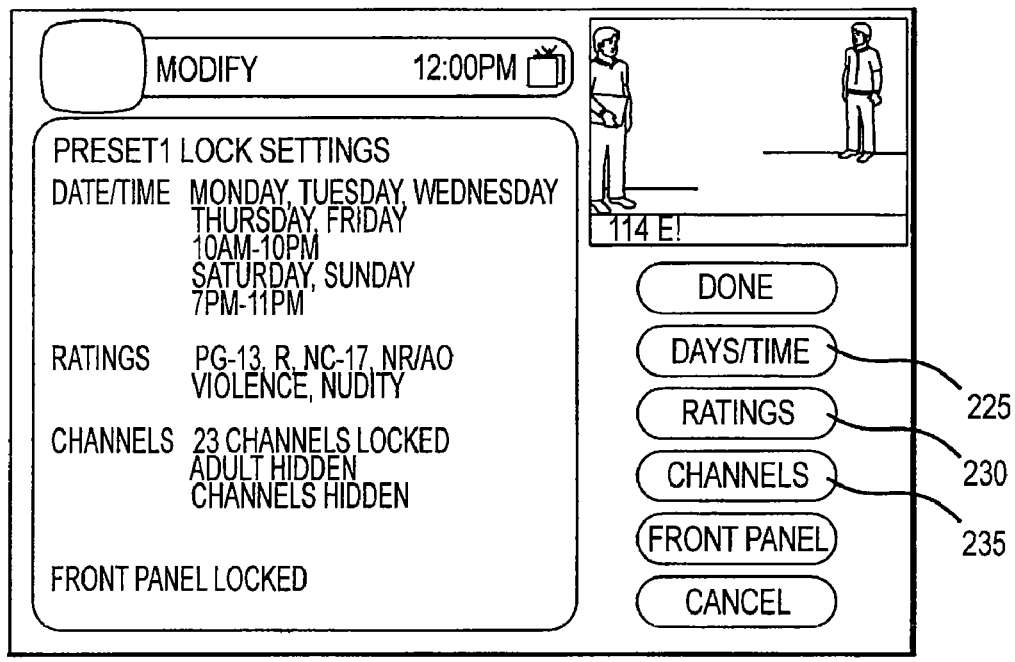
FIG. 2B is an exemplary configuration screen in accordance with embodiments which can provide access to configuration options for a particular set of restriction criteria.

An exemplary procedure for generating a lock for a satellite content provider using an STB is illustrated in FIGS. 2A-2G. FIG. 2A is an image of a first configuration screen which displays four locks associated with buttons 200 labeled "Preset 1" to "Preset 4." By selecting one of the buttons 200 associated with a particular lock, the lock may be activated or deactivated for a particular device, or restriction criteria associated with the selected lock may be generated or modified. In FIG. 1, Preset 1 is selected and characteristics 205 associated with this lock are shown above the buttons 200. Selecting the "Modify" button 210 can provide a selection of exemplary restriction options 225-235 as shown in FIG. 2B. For example, the button 230 labeled "Ratings" can be selected to restrict access to programs having a corresponding rating. It should be noted that the configuration of four locks is exemplary; more or fewer locks may be implemented in various embodiments. Similarly, the screens shown in FIGS. 2A-2G, as well as the number of buttons, options, navigation order, and so forth are likewise exemplary and intended only to illustrate one of many possible options for creating, modifying, setting, deleting and otherwise configuring one or more locks in accordance with an exemplary embodiment.

Figure 2C:
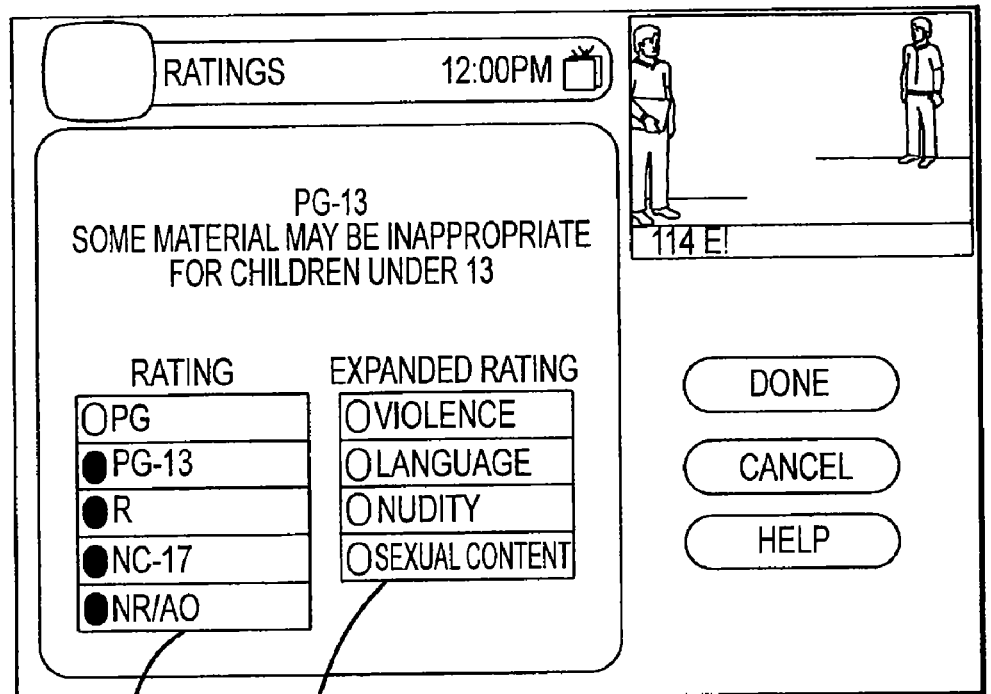
FIG. 2C is an exemplary configuration screen in accordance with embodiments which provide options to restrict access to content based on certain characteristics of the content.

FIG. 2C shows an exemplary screen which permits a user to restrict access to certain content. Any of buttons 240 can also be selected to restrict access to content having certain ratings. For example, as the buttons are selected by a user, the lock is configured to prevent access to content having metadata matching the subject matter, phrase, rating, and so forth corresponding to the button. Buttons 245 may also be selected to provide additional restriction of content based on certain rating phrases.

Figure 2D:
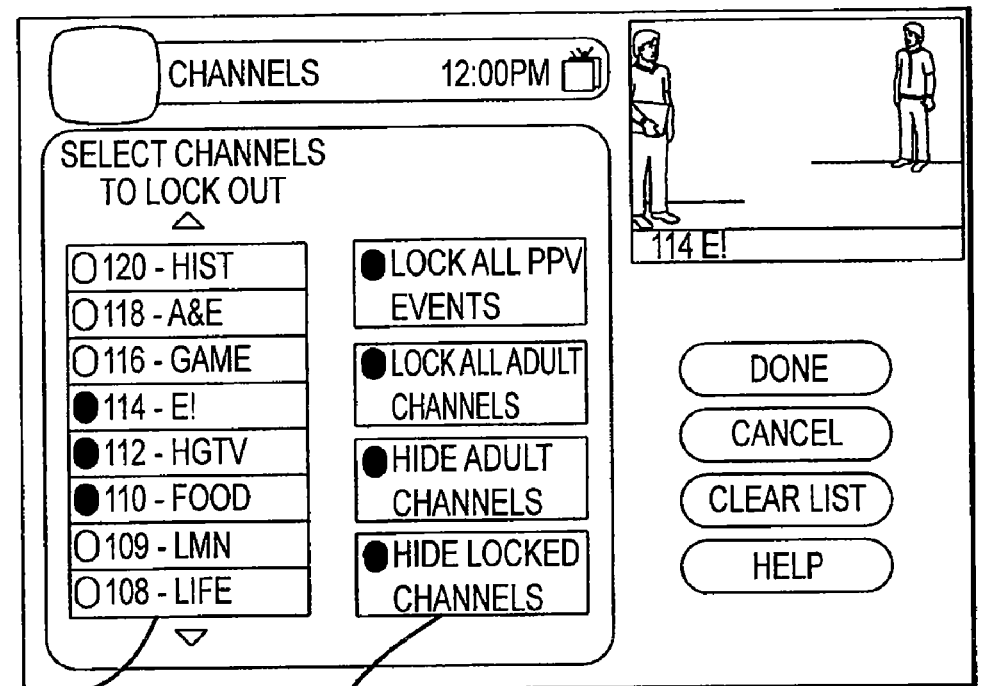
FIG. 2D is an exemplary configuration screen in accordance with embodiments which provide options to restrict access to particular channels, and to prevent display of restricted channels on program guides.

Further content restriction criteria based on specific channels may be configured by selecting the button 235 in FIG. 2B labeled "Channels." FIG. 2D shows an exemplary configuration screen which may be presented after selecting this button. Options shown in FIG. 2D can be used to select further restriction criteria associated with a lock. For example, access to specific channels can be restricted by selecting corresponding channel buttons 250. Access to pay-per-view (PPV) events and/or adult channels can also be restricted, and listings of adult channels and/or restricted channels can be hidden by selecting corresponding buttons 255. Options to restrict access to various other categories of channels may be presented in a similar manner.

Figure 2E:
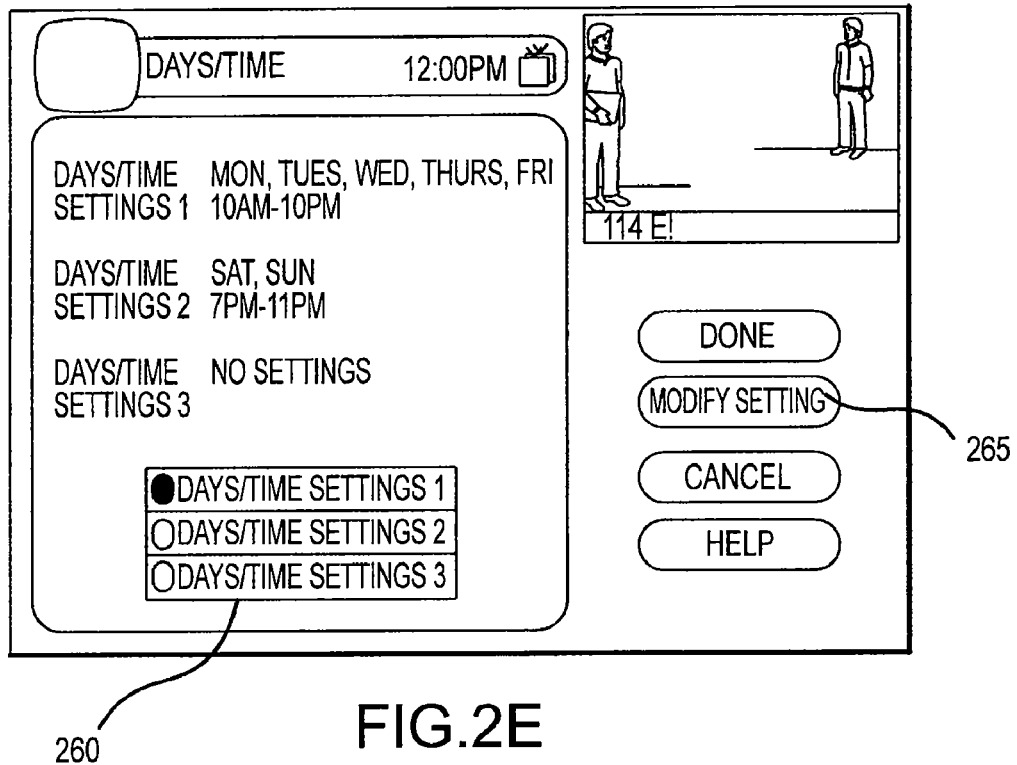
FIG. 2E is an exemplary configuration screen in accordance with embodiments which provide access to three sets of content restriction criteria based on time.
Figure 2F:
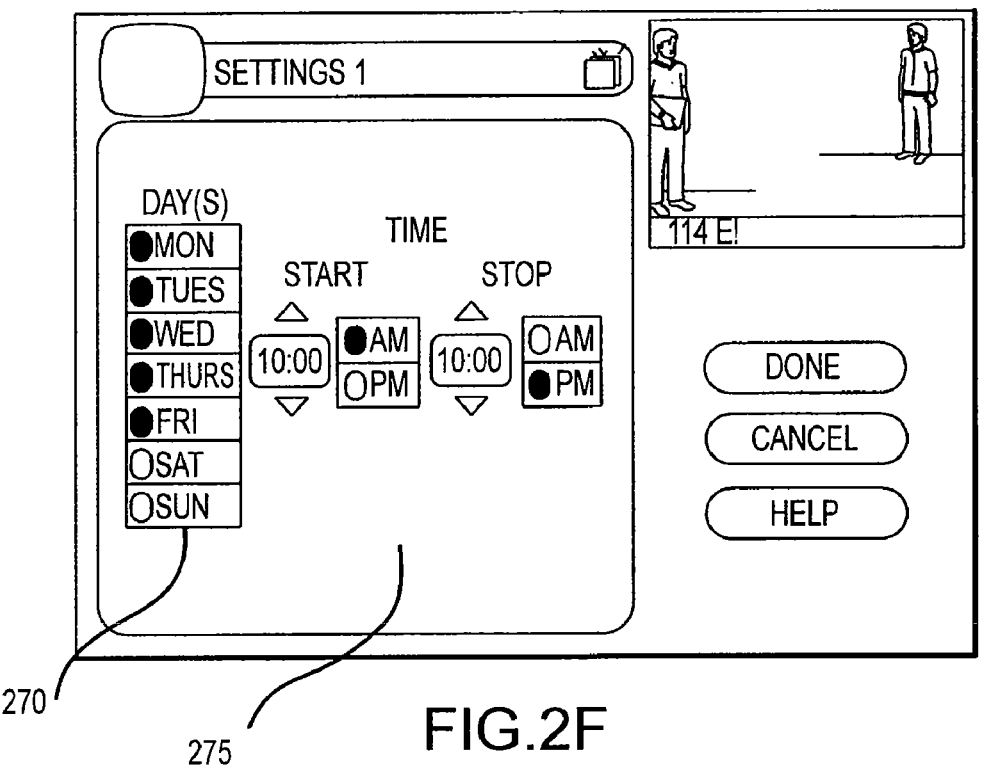
FIG. 2F is an exemplary configuration screen in accordance with embodiments which provide options to restrict access to content based on time of day and day of the week.

Time-based content restriction criteria can be configured by selecting the button 225 labeled "Day/Time" in FIG. 2B. This can reveal an exemplary screen which can provide access to three sets of time settings 260 as shown in FIG. 2E. In this figure, the time criteria labeled "Day/Time Settings 1" is highlighted. Selecting the button 265 labeled "Modify Settings" can permit access to controls 270, 275 to adjust parameters associated with "Day/Time Settings 1" via the configuration screen shown in FIG. 2F. Buttons 270 in FIG. 2F may be selected to specify that content to be restricted on certain days of the week. Also, controls 275 in FIG. 2F may be used to set start and stop times for restricting access to content identified using the other parameters described herein. Similar sets of day and time constraints for accessing content may be set by selecting the buttons 260 labeled "Day/Time Settings 2" and/or "Day/Time Settings 3" in FIG. 2E. Additional sets of Day/Time settings which may be configured for a particular lock can be provided if desired.

Figure 2G:
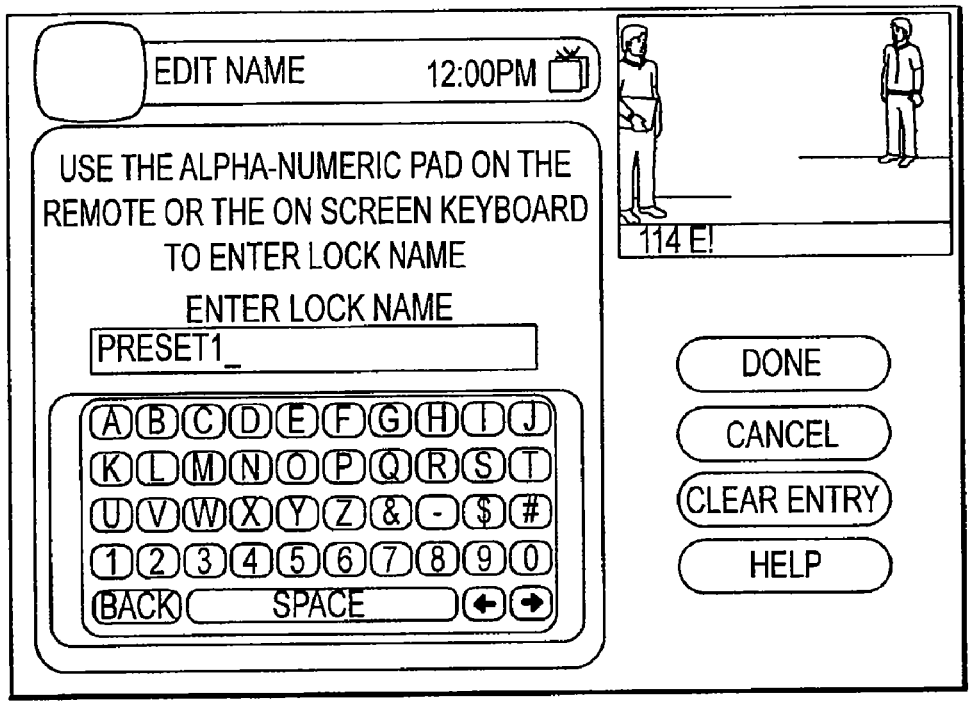
FIG. 2G is an exemplary configuration screen in accordance with embodiments which provide an option to label a particular set of content restriction criteria.

Selecting the button 215 in FIG. 2A can reveal a configuration screen, shown on FIG. 2G, which provides an option for assigning an identifier or label to a lock. Labels can be provided, e.g., to help identify which users are to be associated with a lock, or to describe the criteria such as time or type of content used to restrict access to content by the lock.

Figure 2H:
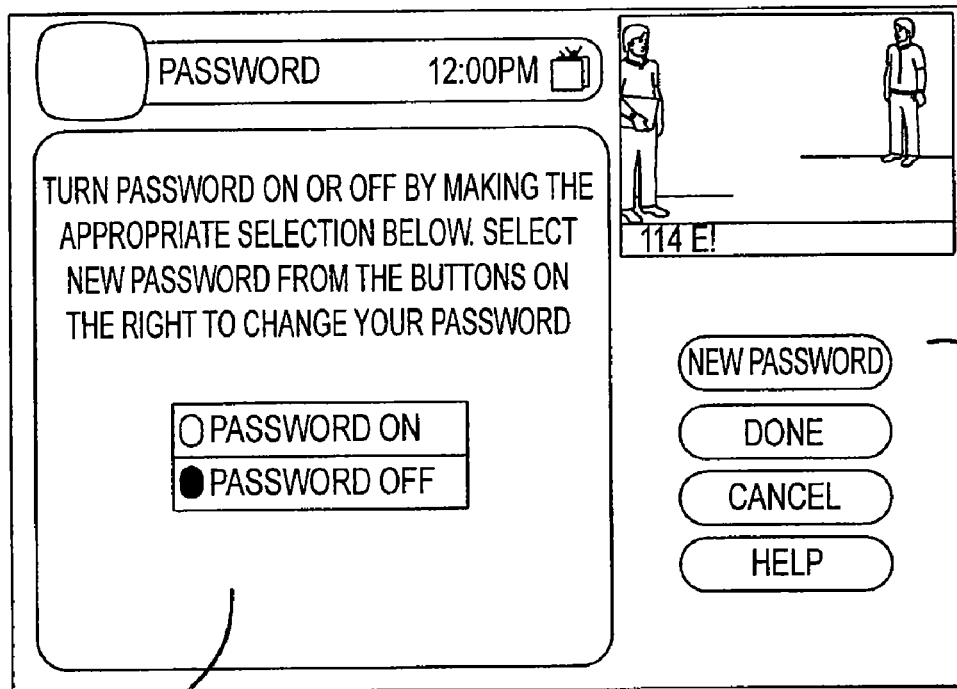
FIG. 2H is an exemplary configuration screen in accordance with embodiments which provide an option to activate or deactivate a particular set of content restriction criteria, and to create a password which allows access to restricted content.

Activating or deactivating a particular lock can be accomplished by selecting the button 220 in FIG. 2A labeled "Password." Selecting this option can reveal the configuration screen shown in FIG. 2H. This exemplary screen can provide options 280 to activate or deactivate the lock by selecting "Password On" or "Password Off," respectively. A password can be created or changed by selecting the button 285 labeled "New Password" in FIG. 2H. Providing this password to the STB can permit access to content that would otherwise be restricted based on the criteria selected in FIGS. 2C-2F.

Access to the lock configuration and activation screens shown in FIGS. 2A-2H can be limited by requiring entry of a system password to display these screens. In this manner, permission to generate and activate locks can be limited to users having the system password.

Figure 3:
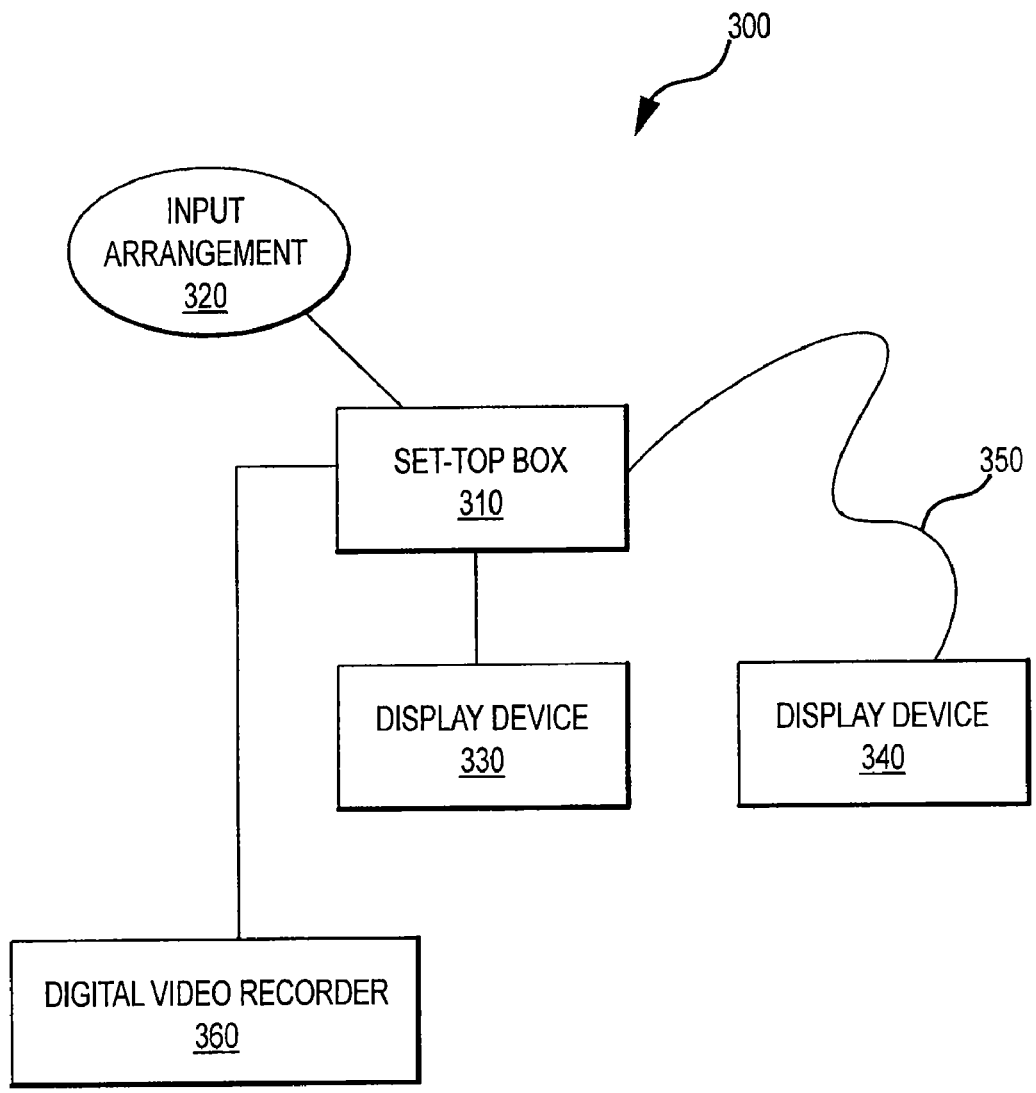
FIG. 3 is a diagram of an exemplary system in accordance with embodiments of the present invention.

FIG. 3 shows an exemplary system 300 which may be used in accordance with certain embodiments of the present invention. The system 300 includes a set-top box 310, which can include, for example, a cable or satellite receiver, a media server, etc. An input arrangement 320 is provided in communication with the STB 310. The input arrangement 320 can be a remote control, a keyboard, a control panel associated with the STB 310, and so on. In certain embodiments, the input arrangement 320 can include, or be, a portable memory storage medium such as, e.g., a USB drive or memory card, which is capable of being accessed by the STB 310. The STB 310 can read or receive data containing lock configuration information from the storage medium/input arrangement, and restrict access to content based on the data. A display device 330, such as a television, computer display or video monitor or projector, is configured to receive and display audiovisual content from the STB 310.

One or more locks that may restrict access to content provided by the STB 310 can be configured using the input arrangement 320, and the configuration data can be provided to the STB 310. A password allowing access to restricted content can be provided to the system 300 using the input arrangement 320 or an alternative input arrangement.

In certain embodiments of the present invention, the STB 310 can communicate with one or more optional additional display devices 340 via a network 350 or other signal transfer technique. The network 350 may be a wired or wireless connection. A lock capable of restricting access to content, as described herein, may be configured using the input arrangement 320 associated with the STB 310, and the lock may also be provided to the additional display device 340 to limit access to content through that device as well. The additional display device 340 may also be associated with another STB. Alternatively, a lock containing different restriction criteria may be configured using the input arrangement 320 and applied to the display device 340. Thus a single input arrangement 320 may be used to configure and provide distinct locks for a variety of display devices over a network or by other data communication techniques. Additionally, distinct locks for a variety of display devices may be viewed through any display device connected to the STB 310 (or other device storing the distinct locks).

For example, a parent may generate a lock using a personal computer connected to a local network. The lock may contain a set of content restriction criteria that limit access to certain channels at certain times. This restriction data can then be provided to one or more media servers or satellite/cable receivers that are configured to communicate with the computer, and which may have display devices associated with them. In this manner, for example, a single lock can be used to restrict access to certain content on each television in a household. One or more passwords may be provided to allow access to some or all restricted content on any or all televisions. Distinct passwords may be provided to different users to allow them to access various subsets of content, or subsets of locks, on specific televisions.

In further embodiments of the present invention, the input arrangement 320 can be a cell phone or PDA that is capable of communicating data to the STB 310. Using this type of arrangement, access to content can be restricted or allowed remotely at any time. For example, parents away from home may be able to set up and activate content restrictions for their children who are at home, or deactivate restrictions, via a cell phone.

In still further exemplary embodiments of the invention, a digital video recorder (DVR) 360 may be associated with or incorporated into an STB 310. The DVR may be programmed to record content provided by the STB 310, where access to the content has been restricted by a lock. The system 300 can allow the restricted content to be recorded, but it can encrypt the content so it may only be viewed upon playback by entering a password associated with the lock. Thus restricted content may be recorded and saved, and access to the content may be granted later if desired by providing the correct password or code.

Various techniques for configuring locks and applying them to content sources and display devices may be used in accordance with embodiments of the present invention. The particular choice of these options can be based, for example, on the types of devices being used and the available communication pathways among them. Conventional set-top boxes (e.g., receivers) can output cable- or satellite-based content to a display device. These STBs may be programmed directly with various restriction criteria using, e.g., buttons on a control panel or a remote control. Options for configuring a lock can be displayed and accessed on a display device via screens such as those shown in FIGS. 2A-2H. Receivers may be configured to communicate with each other over a wired or wireless network. This can allow locks configured using a particular receiver to be applied to other receivers accessible by the network. Alternatively, the receivers can be configured to read data associated with lock configurations from portable storage media, and the locks may be applied to the receivers directly from the storage media.

Cell phones or other communication devices can also be used to generate criteria for restricting content access and sending it to receivers, media servers, other cell phones, etc. The various devices can be identified on a network using conventional techniques involving, e.g., IP addresses, MAC hardware identification numbers, cell phone numbers, etc. Authentication can also be required when applying content restriction criteria to any device over a network.

Locks may be applied to mobile devices, such as those used to transport or transfer locks, as described elsewhere herein. For example, a lock may be created by means of a remote control or other input device and stored on a DVR or STB. The lock may be transmitted to a mobile device, such as another remote (or the remote used to create the lock) and affect the functions of the remote. As yet another example, a lock may be exported from a STB, PC, DVR and so forth to a mobile phone and act to restrict the phone's operation when certain conditions are met. Continuing the example, a parent may create a lock in the manner detailed herein and transmit the lock to a child's phone. The lock may restrict use of the phone at certain times or to certain telephone numbers, such that after a certain time the phone becomes inoperative or may only be used to call the parent.

As yet another example but related to the one above, a lock may be set on a mobile device in order to activate only in conjunction with other operational features of the mobile device. For example, a lock may be created and placed on a mobile phone such that the lock activates only when the global positioning system of the phone, which is operative to measure position in conjunction with time, determines that a position is changing more rapidly than the lock permits (e.g., the phone is moving at a rate exceeding the lock's activation parameter). When this occurs, for example because the holder of the mobile phone is in an automobile traveling at a certain speed, the lock may restrict access to any of the phone's features, including the ability to initiate outbound calls or accept inbound calls.

Locks may also be attached to content provided in a storage medium such as a DVD or a hard drive. Alternatively, locks to restrict access to content can also be applied to devices capable of displaying such stored content such as, e.g., DVD players, DVRs, media servers, etc. These devices can optionally be configured to detect certain characteristics of the content and/or time-related parameters, and they can limit access to the content based on any desired combination of the criteria described herein.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. In addition, all publications and patent documents referenced herein are incorporated herein by reference in their entireties.

What is claimed is:

1. A method of restricting access to content, comprising:
   entering a first restriction criterion through an input arrangement, wherein the input arrangement is in communication with a device arrangement, and wherein the device arrangement comprises:
   a first television receiver connected to a first display device, the first television receiver comprising a memory arrangement;
   a second television receiver connected to a second display device, the second television receiver being configured to receive electronic data across an electronic network from the first television receiver,
   wherein the first display device and the second display device are configured to at least display visual images;
   transmitting the first restriction criterion to the first television receiver of the device arrangement, wherein the first restriction criterion is stored in the memory arrangement as a first lock that prevents access to content specified by the first restriction criterion; and
   associating the first lock with the first display device through the input arrangement, wherein the first lock prevents content specified by the first restriction criterion from being shown on the first display device, wherein the first television receiver transmits the first lock across the electronic network to the second television receiver, and wherein the first lock does not prevent content specified by the first restriction criterion from being shown on the second display device.

2. The method of claim 1, further comprising:
   entering a second restriction criterion through the input arrangement;
   transmitting the second restriction criterion to the first television receiver of the device arrangement, wherein the second restriction criterion is stored in the memory arrangement as a second lock, the second lock preventing access to content specified by the second restriction criterion; and
   associating the second lock with the first and second display device through the input arrangement, wherein the first television receiver transmits the second lock across the electronic network to the second television receiver, and wherein the second lock prevents content specified by the second restriction criterion from being shown on the first and second display device.

3. The method of claim 1, comprising:
   entering a second restriction criterion through the input arrangement; and
   transmitting the second restriction criterion to the first television receiver of the device arrangement, wherein the second restriction criterion and the first restriction criterion are stored in the memory arrangement as the first lock, the first lock preventing access to content specified by the first and second restriction criterion;
   wherein the first lock prevents content specified by the first and second restriction criterion from being shown on the first display device and does not prevent content specified by the first and second restriction criterion from being shown on the second display device.

4. The method of claim 2, comprising:
   creating a password through the input arrangement;
   transmitting the password to the device arrangement, wherein the password is stored in the memory arrangement;
   associating the password with the first device, wherein the password disables all locks on the first device and does not disable any locks on the second device.

5. The method of claim 2, comprising:
creating a password through the input arrangement;
transmitting the password to the device arrangement, wherein the password is stored in the memory arrangement;
associating the password with the first lock, wherein the password disables the first lock and does not disable the second lock.

6. The method of claim 3, comprising:
creating a password through the input arrangement;
transmitting the password to the device arrangement, wherein the password is stored in the memory arrangement;
associating the password with the first lock and the first criterion, wherein the password partially disables the first lock by allowing access to content specified by the first criterion and not allowing access to content specified by the second criterion.

7. The method of claim 1, wherein the device arrangement further comprises a set-top box connected to the first display device and to the second display device.

8. The method of claim 1, wherein the device arrangement further comprises:
a first set-top box connected to the first display device; and
a second set-top box connected to the second display device.

9. The method of claim 1, wherein the device arrangement further comprises a computer connected to the first display device.

10. The method of claim 1, wherein the first restriction criterion prevents access to content based on a time of day.

11. The method of claim 1, wherein the first restriction criterion prevents access to content that is accessed in exchange for a fee.

12. The method of claim 2, wherein the first restriction criterion prevents access to content based on a time of day and the second criterion prevents access based on a classification of the content.

13. The method of claim 6, wherein the first restriction criterion prevents access to streaming media.

14. The method of claim 6, wherein the first restriction criterion prevents access to chatrooms.

15. The method of claim 6, wherein the first restriction criterion prevents
access to checkout web pages for online stores.

16. A system for restricting access to content, comprising:
an input arrangement operable to receive a restriction criterion from a user;
a device arrangement in communication with the input arrangement and operable to receive the restriction criterion from the input arrangement, the device arrangement comprising:
a first display device configured to at least display visual images;
a second display device configured to at least display visual images;
a first television receiver connected to the first display device, the first television receiver having a memory arrangement operable to store the first restriction criterion as a first lock, the first lock operable to prevent access to content specified by the first restriction criterion; and
a second television receiver connected to the second display device, wherein the first television receiver is connected to the second television receiver across an electronic network,
wherein the first television receiver is further operable to receive a command from the input arrangement to associate the first lock with the first display device thereby preventing content specified by the first restriction criterion from being shown on the first display device, wherein the first television receiver is further operable to transmit the first lock across the electronic network to the second television receiver, and wherein the first lock does not prevent content specified by the first restriction criterion from being shown on the second display device.

17. The system of claim 16, wherein the input arrangement is a remote control device.

18. The system of claim 16, wherein the input arrangement is a cellular phone.

19. The system of claim 16, wherein the memory arrangement is a portable memory storage medium.

20. A system for restricting access to content, comprising:
a portable storage medium having a first and a second restriction criterion stored thereon;
a device arrangement operable to receive the restriction criterion from the portable storage medium via a data exchange port, the device arrangement comprising:
a first display device configured to display visual images;
a second display device configured to display visual images; and
a first television receiver connected to the first display device, the first television receiver having a memory arrangement in communication with the data exchange port and operable to store the first restriction criterion as a first lock and the second restriction criterion as a second lock, the first lock operable to prevent access to content specified by the first restriction criterion and the second lock operable to prevent access to content specified by the second criterion; and
a second television receiver connected to the second display device, wherein the first television receiver is connected to the second television receiver across an electronic network; and
an input arrangement operable to receive first and second authorization codes from one or more users;
wherein the first television receiver is further operable to receive the first authorization code, thereby activating the first and second locks to associate the first and second locks with the first display device to prevent content specified by the first and second restriction criterion from being shown on the first display device,
wherein the first television receiver is further operable to transmit the first and second locks across the electronic network to the second television receiver, and
wherein the first television receiver is further operable to receive the second authorization code and transmit the second authorization code across the electronic network to the second television receiver, thereby activating the first and second locks to associate the first and second locks with the second display device to prevent content specified by the first criterion from being shown on the second display device but not preventing content specified by the second restriction criterion from being shown on the second display device.

* * * * *